United States Patent [19]

Ekiner

[11] Patent Number: 5,917,137
[45] Date of Patent: Jun. 29, 1999

[54] GAS SEPARATION MEMBRANES OF BLENDS OF POLYETHERSULFONES WITH AROMATIC POLYIMIDES

[75] Inventor: Okan Max Ekiner, Wilmington, Del.

[73] Assignee: L'Air Liquide, Societe Anonyme pour l'Etude et l'Exploitation des Procedes Georges Claude, Paris Cedex, France

[21] Appl. No.: 08/805,188

[22] Filed: Feb. 27, 1997

Related U.S. Application Data

[63] Continuation of application No. 08/496,374, Jun. 29, 1995, abandoned, which is a continuation-in-part of application No. 08/139,441, Oct. 19, 1993, abandoned.

[51] Int. Cl.⁶ .................................................... B01D 53/22
[52] U.S. Cl. .............................. 96/10; 96/8; 96/13; 96/14; 525/436
[58] Field of Search .................................. 96/8, 10, 13, 14

[56] References Cited

U.S. PATENT DOCUMENTS

| 5,085,676 | 2/1992 | Ekiner et al. | 55/158 |
| 5,286,812 | 2/1994 | Karasz et al. | 525/436 |

*Primary Examiner*—Ana Woodward
*Attorney, Agent, or Firm*—Linda K. Russell

[57] ABSTRACT

The invention provides for gas separation membranes with superior gas transport properties made from certain two- and three-component blends of polyethersulfone with aromatic polyimides, to provide a gas separation membrane with superior productivity and good selectivity.

4 Claims, No Drawings

GAS SEPARATION MEMBRANES OF BLENDS OF POLYETHERSULFONES WITH AROMATIC POLYIMIDES

CROSS-REFERENCE TO RELATED APPLICATIONS

This is a continuation of application Ser. No. 08/496,374, filed Jun. 29, 1995, which is a continuation-in-part of U.S. Ser. No. 08/139,441, filed Oct. 19, 1993, abandoned.

BACKGROUND OF THE INVENTION

(I) Field of the Invention

The present invention relates generally to gas separation membranes cast from a miscible two-component or three-component polymer blend of (a) aromatic polyethersulfones with (b) an aromatic polyimide I, and optionally (c) an aromatic polyimide II, polyamide or polyamide-imide. The blends provide gas separation membranes cast therefrom. The precise gas transport properties of the membrane may be adjusted based on the blending of the specific polymer components.

(II) Description of Related Art

It is well known to modify polymer properties through blending to obtain inexpensive materials with improved characteristics. Polymer blends are broadly classified into homogeneous (miscible) and heterogeneous (immiscible) blends. Homogeneous blends are relatively rare; however, a homogeneous blend of an aromatic polyethersulfone and an aromatic polyimide has been described in the art. In particular, "Thermal and Rheological Properties of Miscible Polyethersulfone/Polyimide Blends" by K. Liang, J. Grebowicz, E. Valles, F. E. Karasz and W. J. MacKnight, published in the Journal of Polymer Science: Part B: Polymer Physics, Vol. 30, pp. $^{465-476}$ (1992) describes a miscible blend of an aromatic polyethersulfone (commercial name VICTREX®) and an aromatic polyimide (commercial name MATRIMID® 5218) over the entire blend composition range, particularly blends containing less than 10% of the aromatic polyimide.

Aromatic polyethersulfones are not, however, miscible with other aromatic polyimides, polyamides or polyamide-imides. This immiscibility, along with excellent high-temperature properties and high softening temperatures, have made blends of aromatic polyethersulfones and aromatic polyimides, polyamides or polyamide-imides very difficult to fabricate into many products. The fabrication of films, coatings, and other structures from blends of aromatic polyethersulfones and aromatic polyimides, polyamides or polyamideimides generally requires elaborate processes. Particularly, it is known that the aromatic polyethersulfone having the following repeating formula:

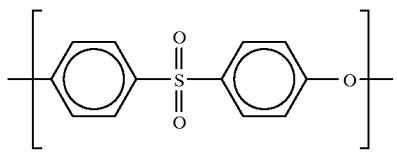

is not miscible with certain alkyl substituted aromatic polyimides, polyamides or polyamide-imides.

It is also generally known that gas separation membranes may be cast from polymers. The separation of gas components by polymer membranes is thought to depend on chemical affinities, kinetics and structural characteristics; it being known that rubbery polymers are generally characterized by high diffusion and relatively low selectivity while glassy polymers are generally characterized by lower diffusion and higher selectivities.

Polymer blending has traditionally been thought to be either problematic or of no benefit in the membrane field, primarily because different polymers are generally not miscible with one another. Those few polymers which are thought to be miscible offer no blending advantage in the membrane field because of various reasons, including difficulty in blending, poor mechanical properties, limited range of gas transport properties, and complex relationships between blend composition and gas transport properties.

U.S. Pat. No. 5,055,116 describes a blend of certain aromatic polyimides, in which the blending of the polymer components is adjusted to achieve certain permeability and selectivity of a polymer membrane. The final properties of a new polymer membrane may be predicted so that a membrane with those desired final properties can then be manufactured.

SUMMARY OF THE INVENTION

The present invention provides for gas separation membranes made from certain miscible polymer blends including a two-component blend of an (a) aromatic polyethersulfone and (b) an aromatic polyimide I and a three-component blend of (a) an aromatic polyethersulfone, (b) an aromatic polyimide I and (c) certain aromatic polyimides II, polyamides or polyamide-imides, or mixtures thereof. The gas permeability and selectivity of these membranes is superior. The inventive membranes prepared from the blends of this invention are extremely useful in separation processes involving, for example, $H_2$, $N_2$, $CH_4$, CO, $CO_2$, He, and $O_2$, by virtue of the high permeability and selectivity exhibited by membranes made from the polymer blends.

DETAILED DESCRIPTION OF THE INVENTION

The present invention provides for membranes or membranous structures made from miscible two-component or three-component polymer blends. The blend comprises (a) an aromatic polyethersulfone, (b) an aromatic polyimide I, and, optionally (c) certain aromatic polyimides II, aromatic polyamides or aromatic polyamide-imides, or mixtures thereof.

The blend miscibility of the polymers may be confirmed by the presence of single composition dependent glass transition temperature lying between those of the constituent blend components. Differential Scanning Calorimetry was used to measure glass transition temperature.

Component (a)

The aromatic polyethersulfone (a) used in the two- or three-component blends has the following repeating unit:

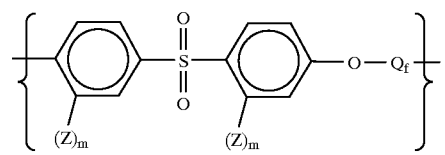

where f is 0 or 1 and Q is has the following formula:

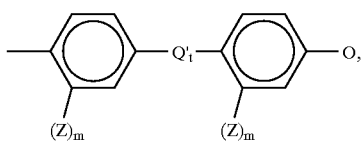

where t is 0 or 1, preferably 0 and Q' is

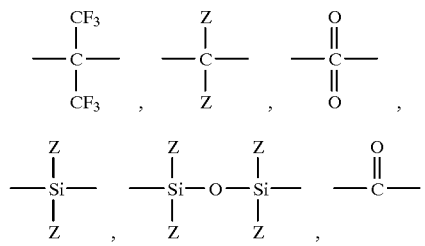

or mixtures thereof.

Z in all cases is independently —H, alkyl groups having 1–6 carbon atoms, aromatic groups having 6–12 carbon atoms, or the halogen —F, —Cl, —Br or —I, Z is preferably —H, m is an integer from 0 to 4, preferably 0.

Preferred polyethersulfones (a) which are commercially available have the following repeating chemical structures:

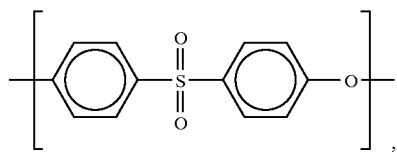

available from ICI Americas Corp. as VICTREX®;

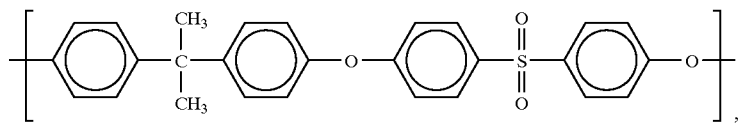

available from Amoco Corp. as UDEL®; and

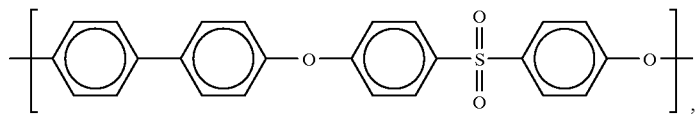

available from Amoco Corp. as RYDEL®.

Component (c)

The aromatic polyimides II useful in component (c) of the blends of the present invention (sometimes referred to hereinafter as "alkyl-substituted aromatic polyamides") contain at least one of the following unit:

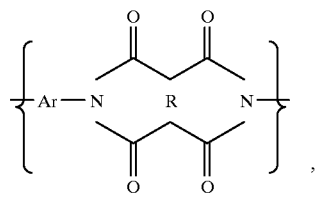

where —Ar— is a moiety having the following formula:

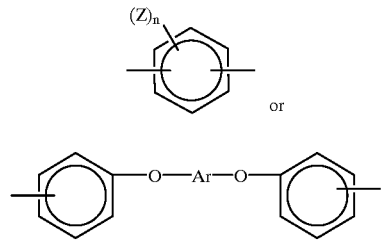

where —Ar'— is

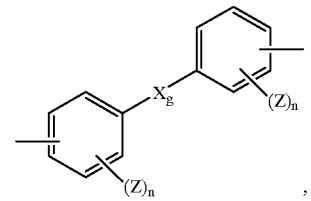

where g is 0 or 1 and X is R'. Preferably g is 0, —R'— is

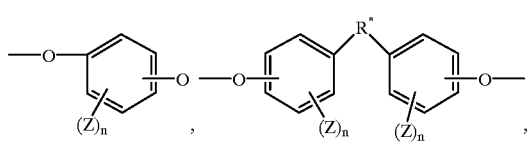

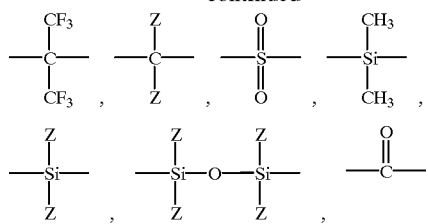

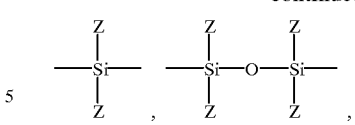

or mixtures thereof, where Z is independently —H, alkyl groups having 1 to 6 carbon atoms, aromatic groups having 6 to 12 carbon atoms, or the halogens —F, —Cl, —Br, or -1, where n is an integer from 0 to 4; or mixtures thereof; where W is independently Alkyl groups having 1 to 6 carbon atoms, aromatic groups having 6 to 12 carbon atoms, or the halogens —F, —Cl, —Br or —I.

In general, the aromatic polyimides II of component (c) of the blends of this invention have a weight average molecular weight within the preferred range of from about 23,000 up to about 400,000 and more preferably from about 50,000 up to about 280,000.

In the preferred process for preparing the polyimides of this invention, approximately equimolar quantities of a dianhydride and the diamine are reacted by well-established procedures known in the art. In general, this process involves the polycondensation of the diamine and the dianhydride followed by the dehydration of the resulting polyamic acid to form a polyimide.

Preferably, the diamine is first dissolved in a polymerization solvent medium and the dianhydride is then gradually added portionwise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

The solvents which may be used in the polymerization process are organic solvents, preferably polar aprotic, whose functional groups do not react with either the dianhydride or diamine reactant to any appreciable extent, and in which either the dianhydride or diamine, preferably both, and the polymer are soluble. Examples of suitable solvents include N,N-dimethylformamide or N,N-dimethylacetamide; dimethylsulfoxide, N-methylpyrrolidone; gamma-butyrolactone; pyridine; diglyme; and like materials as well as mixtures of such solvents.

Polymerization is conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 2 to about 20 hours. The polyamic acid may then be converted to the polyimide by one of several techniques known in the art, for example, by heating the polyamic acid solution until imidization is substantially complete, or by combining the polyamic acid solution and a dehydrating agent, with or without catalyst, and optionally heating the resulting mixture until imidization is complete. The polyimide may then be recovered from solution by precipitation with any suitable non-solvent (e.g., methanol or water) and washed with additional non-solvent.

The resulting polyimides may then, if desired, be blended using conventional solution blending technology to yield a blend having specifically tailored properties.

The aromatic polyamides useful in component (c) of the blends of the present invention contain at least one of the following unit:

or mixtures thereof, where Z is defined above. Preferably, Z is a tertiary butyl group and n=1. R" is

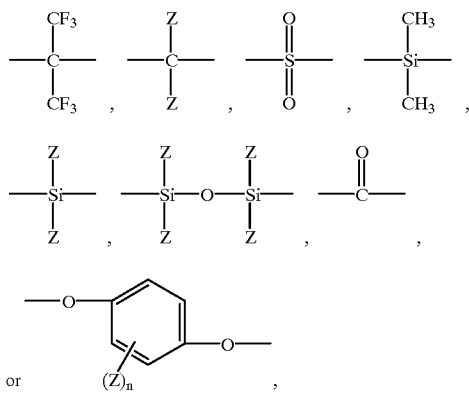

or mixtures thereof.

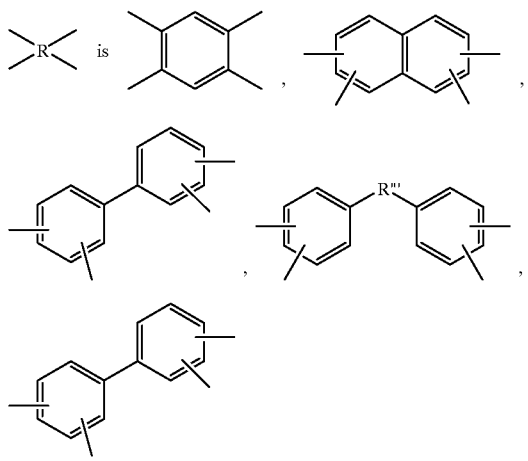

or mixtures thereof, preferably

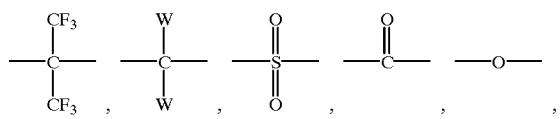

R''' is

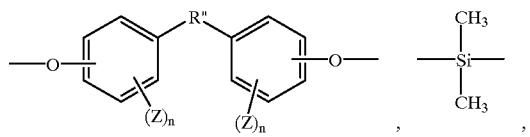

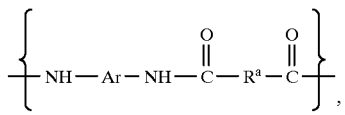

where Ar is defined above and $R^a$ is any aromatic diacid moiety such as

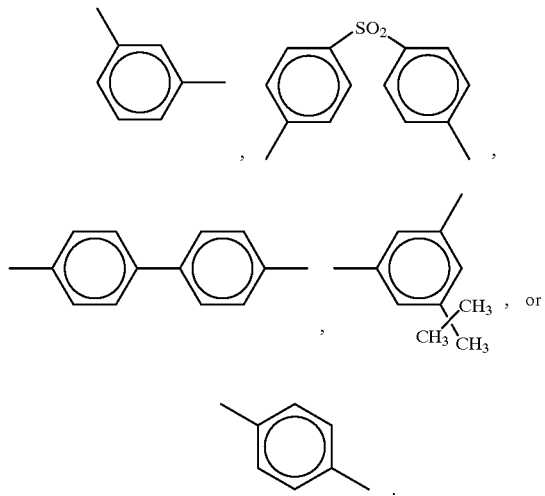

or mixtures thereof, preferably

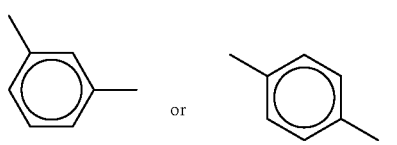

The aromatic polyamide-imides useful in component (c) of the present invention contain at least one of the following unit:

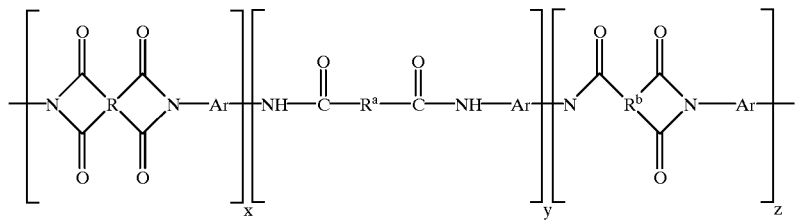

where Ar is defined as above (and may be different in each instance), and R and $R^a$ are as defined above. $R^b$ is any aromatic triacid moeity such as

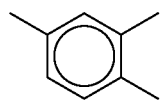

x, y and z are fractions where x+y+z=1.

The polyamide-imides of component (c) may also be mixtures of the polyimides and polyamides described above. The polyamides and polyamide-imides may be prepared by methods well known in the art.

Component (b)

The aromatic polyimide I of component (b) in the present invention has at least one of the following repeating formula:

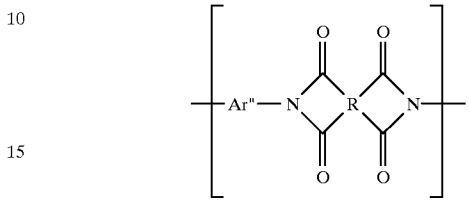

where Ar" is

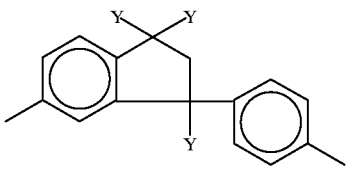

where R is as defined above and —Y is independently an alkyl group having 1–6 carbon atoms or an aromatic group consisting of 6–12 carbon atoms.

When each —Y is —$CH_3$ and R is

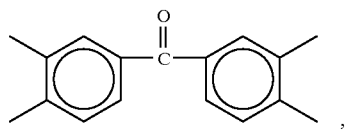

this polymer is commercially available from Ciba-Giegy Company and is generally known as MATRIMID® 5218, which is the preferred composition.

The present invention also provides for gas separation membranes made from a miscible blend of polymers. The polymers employed in the present invention have different molecular structures and different gas permeability and selectivity properties when formed into a membrane, which, when blended, provide a membrane with surprising and superior gas permeability and selectivity.

GENERAL DESCRIPTION OF INVENTION

In particular, the present invention involves a gas separation membrane made from a blend of (a) the aromatic polyethersulfone, (b) the aromatic polyimide I, and, optionally (c) aromatic polyimide II, aromatic polyamide or aromatic polyamide-imide, or mixtures thereof.

As previously indicated, the aromatic polyethersulfone is not generally miscible with the polyimides, polyamides or polyamide-imides described herein.

The blended polymers may be mixed in any ratio to achieve the desired properties of the membrane, preferably up to 50% polyethersulfone and up to 50% aromatic polyimide. Not only do the membranes made from the blends achieve surprising and superior gas transport properties, the productivity and selectivity may be conveniently engineered to achieve the desired final properties of the blended polymer membrane.

As previously indicated, the preferred polymers utilized in the present invention are miscible with one another at blend ratios of interest for superior membranes, as evidenced by a single composition dependent glass transition temperature ($T_g$ °C.) which is between the highest and lowest glass transition temperatures attributable to respective individual polymer components employed in the blend. To the extent that the polymers are not fully miscible with one another, the resultant membrane will not be uniform and the gas transport properties will, in most cases, be adversely effected. In addition, after annealing the blend above the apparent phase boundary temperature which is above the $T_g$ for the blend, some of the blends may exhibit an irreversible phase separation as evidenced by the presence of two $T_g$'s. This implies that the phase boundary does not represent a true state of equilibrium.

To prepare membranes in accordance with this invention, the resulting blend solution is cast as a sheet onto a support, or spun through a spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present.

As used herein and in the accompanying claims (and as will be appreciated by one of ordinary skill in the art), the term "membrane" or "membranous structure" refers, without limitation, to structures used in separation applications, for example, thin films, thick films, composite structures, asymmetric structures, hollow fibers, modules, and like items.

Membranes are used in the separation of $H_2$ from other gasses including $N_2$, CO and $CH_4$; the separation of $CO_2$, $H_2S$ and water vapor from natural gas; and the enrichment of air by nitrogen or oxygen. In addition, hydrogen is recovered from ammonia production plants, and, likewise, hydrogen is recovered from coal gasification processes for the production of synthetic fuel.

The standard unit for measuring the permeability of gases through a dense film membrane is the Barrer, which is defined as follows:

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein the flux (flow rate) in units of cm³/sec, being volume per seconds of permeated gas at standard temperature and pressure, cm. is the thickness of the film, cm² is the area of film, and cm. Hg is the pressure (or driving force).

The selectivity of a membrane in separating a two-component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, α $O_2/N_2$=10 indicates that the subject membrane allows oxygen gas to pass through at a rate ten times that of nitrogen.

The productivity of an asymmetric membrane is measured in GPUs which is defined as follows:

$$GPU = 10^{-6} \times \frac{\text{cm}^3 \text{ (STP)}}{\text{cm}^2\text{-sec (cm. Hg)}}$$

EXAMPLES

The following examples are illustrative of the polyimide blends and membranes made in accordance with the present invention. The components used in the'se Examples are as follows:

(1) "Polyethersulfone" or "PES," component (a) means VICTREX®, an aromatic polyethersulfone having the following repeating chemical structure:

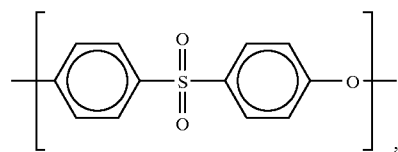

which is commercially available from ICI Americas Corporation.

(2) "Aromatic polyimide," component (c), means MATRIMID® a 5218 which is the polyimide which is the condensation product of 3,3',4,4'-benzophenone tetracarboxylic dianhydride and 5(6)-amino-1-(4'-aminophenyl)-1,3,3'-trimethylindane commercially available from Ciba-Giegy Corporation.

(3) "Alkyl substituted aromatic polyimide," component (c), means a copolyimide formed from:

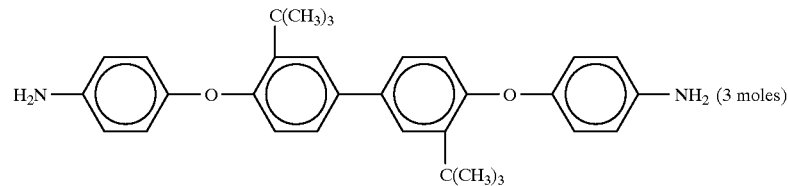

(4) "SYLGARD®" is SYLGARD® 184, an elastomeric silicone material commercially available from Dow Corning Corporation.

(5) "UTLTEM®" is ULTEM® 1000 a polyetherimide having the following repeating formula:

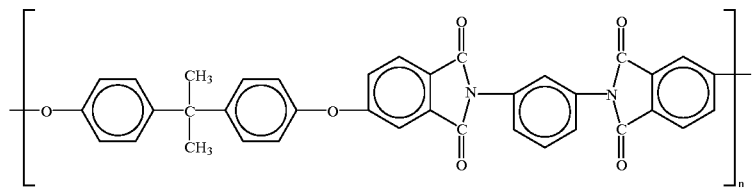

commercially available from General Electric Company.

Example 1

This example describes the process for making 50:50 wt. Polyethersulfone ("PES"): aromatic polyimide (b) binary blend dense film samples and for blend miscibility determination and the measurement of the intrinsic $O_2/N_2$ permeation properties. A 20% wt. solution of 50:50 wt. PES:aromatic polyimide blend solution in N-methylpyrrolidone solvent was prepared. The blend polymer solution was cast on a hot plate maintained at 100° C. with a 15 mil (3.84× $10^{-5}$ meter) casting knife gap. After drying on the plate at 100° C. for 0.5 hours, the films were further dried in a vacuum oven (20 inches mercury) at room temperature overnight. The films were stripped off the plate and dried in a vacuum oven (20 inches mercury) at 120° C. for 4 hours. Five film samples having a thickness range of 1.8 to 2 mils prepared as described above, were tested for mixed gas $O_2/N_2$ (21/79 mole ratio) permeabilities at 30° C. The average of the permeability and selectivity measurements were:

$O_2$ Productivity=1.12 Barrers $O_2/N_2$ Selectivity=6.4

The blend miscibility of the 50:50 wt. PES:aromatic polyimide blend was confirmed by differential scanning calorimetry (DSC). The first heat DSC scan revealed the presence of a single $T_g$ of about 260° C. which is in between the $T_g$'s of the individual blend components (Polyethersulfone $T_g$=230° C. and aromatic polyimide $T_g$=318° C.). However, following annealing above the $T_g$ of the blend, a second DSC scan revealed the presence of two $T_g$'s corresponding to the individual blend components.

Example 2

This example describes the process for preparing 50:50 wt. PES:aromatic polyimide (b) blend hollow fiber membranes. A polymer solution was prepared with a polymer content of 30% wt. containing 50:50 wt. PES:aromatic polyimide blend polymer and 10.5 wt. % tetramethylene sulfone and 1.8 wt. % acetic anhydride in N-methylpyrrolidone. The above polymer solution was extruded through a hollow fiber spinneret with fiber channel dimensions of outer diameter (OD) equal to 21 mils (533 microns) and inner diameter (ID) equal to 10 mils (254 microns) at the rate of 160 cm³/hr at 70° C. A solution of 80 volume % N-methylpyrrolidone in water was injected into the bore of the fiber at a rate of 48 cm³/hr. The spun fiber passed through an air-gap length of 2.5 cm at room temperature into a water coagulant bath maintained at 6° C. The fiber was wound up on a drum at the rate of 100 meters per minute. The water-wet fiber was dehydrated as taught in U.S. Pat. No. 4,080,743. This involved the sequential replacement of water with methanol, the replacement of methanol with hexane, followed by drying. The fibers were potted in an epoxy resin at both ends inside a straight steel tubing to provide gas feed through the bore of the fibers. The fibers were tested for mixed gas $O_2/N_2$ (21/79) with 100 psig bore feed pressure at 21° C. The fibers exhibited the following gas separation properties while producing an inerts enriched product stream containing 95% $N_2$:

$O_2$ Productivity=127 GPU $O_2/N_2$ Selectivity=1.5

The fibers were treated to seal defects protruding through the dense outer gas separating layer as taught in U.S. Pat. No. 4,230,463. This involved contacting the outer surface of the fibers with a hexane solution containing 1% wt. SYLGARD® for a period of 30 minutes at room temperature and at a vacuum of 20 inches mercury in the fiber bore. The hexane was drained and the hollow fibers were allowed to air-dry. The above treated fibers were tested for mixed gas $O_2/N_2$ (21/79) at 100 psig bore feed pressure and 21° C. The fibers exhibited the following separation performance while producing 95% $N_2$:

$O_2$ Productivity=16 GPU $O_2/N_2$ Selectivity=6.7

Example 3

This example describes the process for preparing 25:75 wt. PES:aromatic polyimide (b) hollow fiber membranes. A polymer solution was prepared with a polymer content of 30% wt. containing 25:75 wt. PES:aromatic polyimide blend polymer and 10.5 wt. % tetramethylene sulfone and 1.8 wt. % acetic anhydride in N-methylpyrrolidone. The above polymer solution was extruded through the same hollow fiber spinneret described in Example 2 at a rate of 140 cm³/hr at 80° C. A solution of 80 volume % N-methylpyrrolidone in water was injected into the bore of the fiber at a rate of 45 cm³/hr. The spun fiber passed through an air-gap length of 2.5 cm at room temperature into a water coagulant bath maintained at 29° C. and the fiber was wound up on a drum at the rate of 100 meters per minute. The water-wet fiber was dehydrated and tested for mixed gas $O_2/N_2$ with 100 psig bore feed as described in Example 2. The results were:

$O_2$ Productivity=62 GPU $O_2/N_2$ Selectivity=2.1

The fibers were posttreated by the same procedure described in Example 2 to obtain the following results:

$O_2$ Productivity=11.8 GPU $O_2/N_2$ Selectivity=6.1

Example 4

This example describes the preparation of 75:25 wt. PES:aromatic polyimide (b) hollow fiber membranes. A solution containing 37% of 75:25 wt. PES:aromatic polyimide blend and 12.3 wt. % tetramethylene sulfone and 2.2 wt. % acetic anhydride in N-methylpyrrolidone was extruded through a spinneret having the same fiber channel dimensions described in Example 2 at a rate of 160 cm³/hr at 80° C. A bore fluid containing 80 volume % N-methylpyrrolidone in water was injected at a rate of 52.5 cm³/hr into the bore of the fiber. The spun fiber passed through an air-gap length of 5 cm at ambient temperature into a water coagulation bath maintained at 7° C. and was wound up on a drum at a rate of 100 meters per minute. The water-wet fiber was dehydrated as described in Example 2. Gas separation modules were fabricated by inserting loops of hollow fibers in stainless steel tubing while potting the ends of the fibers in an epoxy resin to provide feed gas inlet, rejected gas outlet and permeate gas outlet. The fibers as described above were tested for mixed gas $O_2/N_2$ (21/79) permeabilities while applying 100 psig on the shell side of the fibers at room temperature. Results are reported below:

$O_2$ Productivity=73 GPU $O_2/N_2$ Selectivity=1.3

The fibers were posttreated as described in Example 2 and retested with shell side feed for mixed gas $O_2/N_2$. Results are reported below:

$O_2$ Productivity=12 GPU $O_2/N_2$ Selectivity=6.9

Examples 5–16

These examples describe the process for making 50:25:25 wt. PES:aromatic polyimide (b): Alkyl-substituted aromatic polyimide (c) ternary blend dense film samples for blend miscibility determination, measurement of the intrinsic mechanical properties and the $O_2/N_2$ permeation properties. A 20% wt. solution of 50:25:25 wt. PES:aromatic polyimide:Alkyl-substituted aromatic polyimide blend solution in N-methylpyrrolidone was prepared. The solution was cast to obtain dense film samples and tested by the same procedures employed in Example 1. The results of the permeability and selectivity measurements are reported below:

$O_2$ Productivity=1.16 Barrers $O_2/N_2$ Selectivity=6.4

The blend miscibility of the 50:25:25 wt. PES:aromatic polyimide: alkyl substituted aromatic polyimide blend was confirmed by DSC. The first heat DSC scan revealed the presence of a single $T_g$ of about 241° C. However, a second heat DSC scan revealed phase separation of the initially miscible blend due to annealing above the $T_g$ of the blend.

The intrinsic $O_2/N_2$ permeation properties of various PES:aromatic polyimide:alkyl substituted aromatic polyimide ternary blend film samples were tested by the method described in Example 1. The results are report in Table 1.

The intrinsic mechanical properties of various PES:aromatic polyimide:alkyl substituted aromatic polyimide ternary blend film sample were measured. The initial elastic modulus, yield stress and % elongation at break were measured in extension at 23° C. according to ASTM D-882 (Tensile Properties of Thin Plastic Sheeting). The results are reported in Table 2.

TABLE 1

GAS SEPARATION PROPERTIES OF TERNARY BLENDS

| | Composition (Wt. Percent) | | | | |
|---|---|---|---|---|---|
| Example | PES (a) | Aromatic Polyimide (b) | Alkyl Substituted Aromatic Polyimide (c) | $O_2$ Permeability (Barrers) | $O_2/N_2$ Selectivity |
| 6 | 80 | 10 | 10 | 1.03 | 5.62 |
| | | | | 1.08 | 5.57 |
| 7 | 45 | 45 | 10 | 1.31 | 5.96 |
| | | | | 1.31 | 5.77 |
| 8 | 10 | 80 | 10 | 2.10 | 5.92 |
| | | | | 2.04 | 6.40 |
| 9 | 10 | 45 | 45 | 2.49 | 6.10 |
| 10 | 10 | 10 | 80 | 2.74 | 6.11 |
| 11 | 50 | 25 | 25 | 1.16 | 6.33 |
| | | | | 1.26 | 6.12 |
| 12 | 40 | 40 | 20 | 1.41 | 6.39 |
| | | | | 1.44 | 6.12 |
| 13 | 25 | 50 | 25 | 1.60 | 6.04 |
| 14 | 100 | — | — | .75 | 6.1 |
| 15 | — | 100 | — | 2.00 | 7.2 |
| 16 | — | — | 100 | 4.10 | 6.25 |

TABLE 2

MECHANICAL PROPERTIES OF TERNARY BLENDS

| | Composition (Wt. Percent) | | | | | |
|---|---|---|---|---|---|---|
| Example | PES (a) | Aromatic Polyimide (b) | Alkyl Substituted Aromatic Polyimide (c) | E (KSI) Elastic Modulus | Yield Stress (KSI) | Elongation (%) |
| 6 | 80 | 10 | 10 | 291 | 11.3 | 5.4 |
| 7 | 45 | 45 | 10 | 314 | 12.9 | 6.5 |
| 8 | 10 | 80 | 10 | 327 | 14.7 | 8.2 |
| 9 | 10 | 45 | 45 | 322 | 14.1 | 8.8 |
| 10 | 10 | 10 | 80 | 322 | 10.7 | 9.6 |
| 11 | 50 | 25 | 25 | 320 | 14.5 | 7.6 |
| 12 | 40 | 40 | 20 | 328 | 12.0 | 5.2 |
| 13 | 25 | 50 | 25 | 326 | 13.3 | 9.9 |
| 14 | 100 | — | — | 294 | 7.6 | 3.3 |
| 15 | — | 100 | — | 339 | 13.6 | 6.6 |
| 16 | — | — | 100 | 329 | 14.6 | 8.4 |

Example 17

This example describes the process for making 50:25:25 wt PES:aromatic polyimide (b):Alkyl-substituted aromatic polyimide (c) ternary blend hollow-fiber membranes. A polymer solution was prepared with a polymer content of 30% wt containing 50:25:25 wt PES:aromatic polyimide (b): alkyl-substituted aromatic polyimide (a) and 10.5 wt. % tetramethylene sulfone plus 1.8 wt. % acetic anhydride in N-methylpyrrolidone. This polymer solution was extruded through a hollow-fiber spinneret with the same fiber channel dimensions (OD) as described in Example 2 at a rate of 160 cm$^3$/hr at 70° C. A solution of 80 volume % N-methylpyrrolidone in water was injected into the bore of the fiber at the rate of 48 cm$^3$/hr. The spun fiber traveled through an air-gap length of 2.5 cm at room temperature into a water coagulant bath maintained at 6° C. and the fiber was wound up on a drum at the speed of 100 meters/minute. The fibers were dehydrated and potted in an epoxy resin to provide gas feed through the bore of the fibers as described in Example 2. The fibers were tested for mixed gas $O_2/N_2$ (21/79) with 100 psig bore feed at room temperature. The fibers exhibited the following separation performance while producing an inert product stream containing 95% $N_2$:

$O_2$ Productivity=121 GPU $O_2/N_2$ Selectivity=2.1

The fibers were posttreated and tested as described in Example 2. The fibers exhibited the following separation performance while producing 95% $N_2$:

$O_2$ Productivity=17 GPU $O_2/N_2$ Selectivity=5.9

The separation performance of the above-treated fibers for other gases were also tested at 100 psig tube-side feed pressure and at room temperature. The single gas permeability data are reported below:

$H_2$ Productivity=245 GPU

He Productivity=242 GPU $N_2$ Productivity=2.3 GPU $CH_4$ Productivity=2.3 GPU $H_2/CH_4$ (Single Gas) Selectivity=107

Example 18

This example describes the process for producing a composite hollow-fiber gas separation membrane comprising a 50:25:25 wt PES:aromatic polyimide (b):Alkyl-substituted aromatic polymer (c) ternary blend as the separating membrane on a polyimide blend substrate. The substrate polymer is a 90:10 wt ULTEM® and aromatic polyimide.

A substrate solution containing 90:10 weight blend ratio of Ultem:aromatic polyimide is prepared according to the formulation: 31% wt blend polymer and 2.3 wt. % $LiNO_3$+ 9.3 wt. % tetramethylene sulfone and 1.5 wt. % acetic anhydride and 0.3 wt. % acetic acid in N-methylpyrrolidone. The 50:25:25 wt PES:aromatic polyimide:Alkyl-substituted aromatic polyimide ternary blend polymer solution described in Example 17 was used as the separating polymer solution. The above solutions were coextruded through a composite fiber spinneret as described in U.S. Pat. No. 5,085,676. The separating layer solution is extruded at a rate of 15 cm$^3$/hr and the substrate solution is extruded at 125 cm$^3$/hr. A solution of 90 volume % N-methylpyrrolidone in water is injected to the bore of the fiber at a rate of 48 cm$^3$/hr while the spinneret is maintained at 90° C. The spun bicomponent fiber is passed through an air-gap of 1 cm at room temperature into a water coagulant bath at 9° C. The composite fiber is wound on a drum at 80 meters/min. The composite fiber is washed and dehydrated by the solvent exchange method as described in Example 2. The fibers were potted at both ends to provide gas feed through the bore of the fibers as described in Example 2. The fibers were tested for mixed gas $O_2/N_2$ (21/79) with 100 psig bore feed at room temperature. The fibers exhibited the following separation performance while producing an inert enriched product stream containing 95% $N_2$:

$O_2$ Productivity=49 GPU $O_2/N_2$ Selectivity=2.5

The fibers were posttreated and tested as described in Example 2. The treated composite fibers exhibited the following separation performance while producing 95% $N_2$:

$O_2$ Productivity=16.5 GPU $O_2/N_2$ Selectivity=6.0

Example 19

This example describes the preparation of 10:10:80 wt PES:aromatic polyimide (b):alkyl-substituted aromatic polyimide (c) ternary blend hollow-fiber membranes. A 28 wt.% polymer solution containing 10:10:80 wt PES:aromatic polyimide (b):alkyl-substituted aromatic polyimide (c) blend polymer and 9.8 wt.% tetramethylenesulfone and 1.7 wt. % acetic anhydride was extruded through a hollow-fiber spinneret having the same fiber channel dimensions as described in Example 2 at the rate of 120 cm$^3$/hr and 80° C. A solution of 80 volume % N-methylpyrrolidone in $H_2O$ was injected into the bore of the fiber at the rate of 48 cm$^3$/hr. The nascent fiber passed through an air-gap length of 7.5 cm at room temperature into a water coagulation bath maintained at 22° C.

The fiber was wound on a drum at the speed of 100 meters/min. The fibers were washed and dehydrated by the same procedure as described in Example 2. Gas separation modules were prepared by inserting loops of the hollow fibers in stainless steel tubing while potting the open ends of the fibers in an epoxy resin to provide feed gas inlet, rejected gas outlet and permeate gas outlet.

The fibers prepared as described above were tested for mixed gas $O_2/N_2$ (21/79 mole) permeabilities while applying 100 psig on the shell side of the fibers at room temperature. Results are reported below:

$O_2$ Productivity=35 GPU $O_2/N_2$ Selectivity=4.2

The fibers were posttreated and tested as described in Example 2. Results are reported below:

$O_2$ Productivity=17 GPU $O_2/N_2$ Selectivity=5.6

Example 20

This example describes the preparation of 1:1:1 wt PES:aromatic polyimide (b):alkyl-substituted aromatic polyimide (c) blend hollow-fiber membranes. A polymer solution containing 30% of the 1:1:1 wt PES:aromatic polyimide (b):alkyl-substituted aromatic polyimide (c) blend and 9 wt. % tetramethylenesulfone and 1.8 wt. % acetic anhydride was extruded through the same hollow-fiber spinneret described in Example 2 at the rate of 150 cm$^3$/hr at 71° C. A solution of 80% volume N-methylpyrrolidone in $H_2O$ was injected into the bore of the hollow fiber at the rate of 48 cm$^3$/hr. The nascent hollow fiber passed through an air-gap length of 5 cm at room temperature into a water coagulation bath maintained at 13° C. The fiber was wound up at the rate of 100 meters/min. The fibers were washed and dehydrated as described in Example 2. Permeators were prepared for testing the above-prepared hollow fibers as described in Example 19. The fibers were tested for mixed gas $O_2/N_2$ permeabilities while applying 100 psig shell-side feed pressure at room temperature to obtain the following results:

O₂ Productivity=26 GPU

O₂/N₂ Selectivity=3.7

The fibers were posttreated and tested as described in Example 2. The results are reported below:

O₂ Productivity=12 GPU

O₂/N₂ Selectivity=6.0

Example 21

This example describes the preparation of 80:10:10 wt PES:aromatic polyimide (b):alkyl-substituted aromatic polyimide (c) blend hollow fibers. A polymer solution containing 37.5% 80:10:10 wt PES:aromatic polyimide (b):alkyl-substituted aromatic polyimide (c) and 13.1 wt. % tetramethylenesulfone and 1.5 wt. % acetic anhydride in N-methylpyrrolidone was extruded through the same hollow-fiber spinneret as described in Example 2 at the rate of 150 cm³/hr at 70° C. A solution of 80% by volume N-methylpyrrolidone in H₂O was injected into the bore of the fiber at the rate of 48 cm³/hr. The nascent fiber passed through an air-gap length of 5 cm at room temperature into a water coagulation bath maintained at 6° C. The fiber was wound up on a drum at the speed of 100 meters/min.

The fibers were washed, dehydrated and potted in an epoxy resin to fabricate permeators as described in Example 20. The fibers were tested for mixed gas O₂/N₂ at 100 psig shell-side feed pressure and room temperature. The results are reported below:

O₂ Productivity=16 GPU

O₂/N₂ Selectivity=1.6

The fibers were posttreated and tested as described in Example 2. The results are reported below:

O₂ Productivity=8 GPU

O₂/N₂ Selectivity=4.7.

Comparative Example

Twenty parts by weight of a 1/1/1 by weight mixture of the following three polymers was dissolved in 80 parts by weight of NMP solvent:

CIBA Matramid® XU218 (polyimide with phenylindane moieties

ICI VICTREX® Polyethersulfone

GE ULTEM® D-1000 polyetherimide.

After dissolution of the polymer mixture in the solvent at room temperature, the resultant solution was cast as a thin film on a hot plate at 100° C. The resultant dry polymer film (approximate thickness, 2 mils) was opaque and cloudy, indicating that the ternary polymer blend was not homogeneous, that is, not molecularly compatible.

What is claimed is:

1. A composite or asymmetric membrane, which comprises a miscible blend of an aromatic polyethersulfone having the following repeating unit

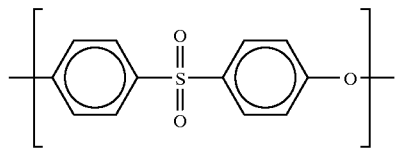

and an aromatic polymide having the following repeating unit

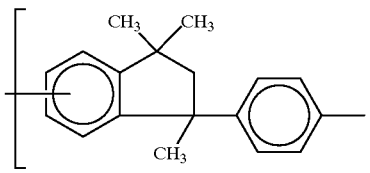

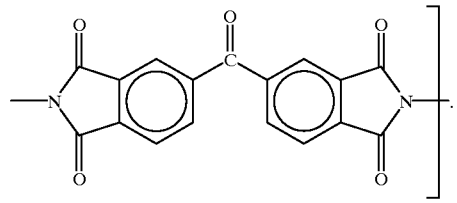

2. The composite or asymmetric membrane according to claim 1, wherein the miscible blend comprises between 1 and 99% by weight of the aromatic polyethersulfone.

3. The composite or asymmetric membrane according to claim 1, wherein the miscible blend comprises at least 25% by weight of the aromatic polymide.

4. The composite or asymmetric membrane according to claim 1, which is in the form of a hollow fiber.

* * * * *